United States Patent
Zhang

(10) Patent No.: US 10,574,904 B2
(45) Date of Patent: Feb. 25, 2020

(54) IMAGING METHOD AND ELECTRONIC DEVICE THEREOF

(71) Applicant: Lenovo (Beijing) Co., Ltd., Beijing (CN)

(72) Inventor: Liang Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/727,899

(22) Filed: Oct. 9, 2017

(65) Prior Publication Data

US 2018/0288315 A1 Oct. 4, 2018

(30) Foreign Application Priority Data

Mar. 31, 2017 (CN) .......................... 2017 1 0210480

(51) Int. Cl.
*H04N 5/262* (2006.01)
*H04N 5/232* (2006.01)

(52) U.S. Cl.
CPC ................................. *H04N 5/2621* (2013.01)

(58) Field of Classification Search
CPC ........... H04N 5/23229; H04N 5/23245; H04N 5/23251; H04N 5/23293; H04N 5/2621; H04N 5/23248; H04N 5/2625; H04N 5/23212; G06T 7/194; G06T 7/20; G06T 7/11

See application file for complete search history.

(56) References Cited

U.S. PATENT DOCUMENTS

| 8,233,055 B2 * | 7/2012 | Matsunaga | H04N 5/232 348/222.1 |
| 2006/0062433 A1 * | 3/2006 | Ikeda | G06T 5/003 382/107 |
| 2008/0094498 A1 * | 4/2008 | Mori | G03B 5/02 348/352 |

(Continued)

FOREIGN PATENT DOCUMENTS

| CN | 102821243 A | 12/2012 |
| CN | 105847662 A | 8/2016 |

(Continued)

OTHER PUBLICATIONS

Jiaofu Pan, Flow to shoot moving objects to shoot high-speed moving objects, Aug. 22, 2013, http://www.chachaba.com/news/digi/yssb/20130320_117183.html.

*Primary Examiner* — Shahbaz Nazrul
(74) *Attorney, Agent, or Firm* — Anova Law Group, PLLC

(57) ABSTRACT

An imaging method and an electronic device are provided. The imaging method includes obtaining a current imaging mode including a sports mode and obtaining an imaging instruction. The imaging method also includes generating a sports image by processing at least one image based on the current imaging mode and in response to the imaging instruction. The sports image includes a target object and a background image, and at least a portion of the background image has a visual effect in one direction. Further, the imaging method includes displaying the sports image. A moving direction of the target object is signified by the one direction presented by the visual effect of the background image in the sports image.

20 Claims, 11 Drawing Sheets

(56) References Cited

U.S. PATENT DOCUMENTS

| | | | | |
|---|---|---|---|---|
| 2009/0135270 A1* | 5/2009 | Makino | ............... | H04N 5/144 |
| | | | | 348/222.1 |
| 2011/0150349 A1* | 6/2011 | Kojima | ............. | G06K 9/00228 |
| | | | | 382/224 |
| 2015/0237260 A1* | 8/2015 | Mukunashi | ........ | H04N 5/23287 |
| | | | | 348/208.11 |
| 2016/0165138 A1* | 6/2016 | Haruna | ............. | H04N 5/23254 |
| | | | | 348/208.3 |
| 2016/0301868 A1* | 10/2016 | Acharya | ............ | H04N 5/23229 |
| 2017/0006228 A1* | 1/2017 | Takayanagi | ........ | H04N 5/23293 |

FOREIGN PATENT DOCUMENTS

| | | |
|---|---|---|
| CN | 106170976 A | 11/2016 |
| WO | 2016164166 A1 | 10/2016 |

\* cited by examiner

IMAGING METHOD AND ELECTRONIC DEVICE THEREOF

CROSS-REFERENCES TO RELATED APPLICATIONS

This application claims the priority of Chinese patent application No. 201710210480.8, filed on Mar. 31, 2017, the entirety of which is incorporated herein by reference.

FIELD OF THE DISCLOSURE

The present disclosure generally relates to the field of image processing technology and, more particularly, relates to an imaging method and an electronic device thereof.

BACKGROUND

When imaging sports scenes, the movement effect of a moving subject needs to be shown out in a static image. The camera needs to keep a same line speed or a same angular velocity as the moving subject to be imaged to achieve a follow-up shooting of the moving subject in conventional solutions. In this manner, the moving subject with a clear image effect, and the background part (and other scenes) with blur image effect are able to be imaged. Thus, the fast movement effect of the moving subject with clear image effect is shown out by the other scenes with blur image effect.

The above solution where the camera needs to keep the same line speed or the same angular velocity as the moving subject to be imaged increases the complexities and difficulties for imaging the moving subject. Sometimes, the imaged scene may even have undesirable effect.

On the one hand, for the follow-up shooting where the camera keeps the same line speed as the moving subject, it is difficult for a general user to do so in many cases unless with the help of special photographic or imaging equipment. For example, a track is provided next to the runway and a camera that moves fast along the track is placed on the track to photograph or image an image of an athlete running. When the camera and the athlete move at nearly a same speed, an image having a desired effect may be captured.

On the other hand, for the follow-up shooting where the camera keeps the same angular velocity as the moving subject, the camera needs to be turned to keep the same angular velocity as the moving subject. In this case, the whole camera shakes, and the entire picture (including the moving subject) has a blur image effect.

The disclosed imaging method and electronic device are directed to solve one or more problems set forth above and other problems in the art.

BRIEF SUMMARY OF THE DISCLOSURE

One aspect of the present disclosure includes an imaging method. The imaging method includes obtaining a current imaging mode including a sports mode and obtaining an imaging instruction. The imaging method also includes generating a sports image by processing at least one image based on the current imaging mode and in response to the imaging instruction. The sports image includes a target object and a background image, and at least a portion of the background image has a visual effect in one direction. Further, the imaging method includes displaying the sports image. A moving direction of the target object is signified by the one direction presented by the visual effect of the background image in the sports image.

Another aspect of the present disclosure includes an electronic device. The electronic device includes a display device, a camera for capturing at least one image, and a processor connected to the display device and the camera. The processor obtains a current imaging mode including a sports mode and obtains an imaging instruction. The processor also generates a sports image by processing at least one image based on the current imaging mode and in response to the imaging instruction. The sports image includes a target object and a background image, and at least a portion of the background image has a visual effect in one direction. Further, the processor displays the sports image on the display device. A moving direction of the target object is signified by the one direction presented by the visual effect of the background image in the sports image.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

FIG. 8 (b) illustrates a schematic diagram of a target object in an image to be processed illustrated in FIG. 8 (a) consistent with some embodiments of the present disclosure;

FIG. 8 (c) illustrates a schematic diagram of an original background image in an image to be processed illustrated in FIG. 8 (a) consistent with some embodiments of the present disclosure;

FIG. 8 (d) illustrates a schematic diagram of a background image after processing an original background image illustrated in FIG. 8 (c) consistent with some embodiments of the present disclosure;

FIG. 8 (e) illustrates a schematic diagram of a sports image having a horizontal movement effect consistent with some embodiments of the present disclosure;

FIG. 9 (b) illustrates a schematic diagram of a sports image having an oblique movement effect consistent with some embodiments of the present disclosure.

DETAILED DESCRIPTION

Reference will now be made in detail to various embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

The disclosed embodiments in the present disclosure are merely examples for illustrating the general principles of the invention. Any equivalent or modification thereof, without departing from the spirit and principle of the present invention, falls within the true scope of the present invention.

Figure 1:
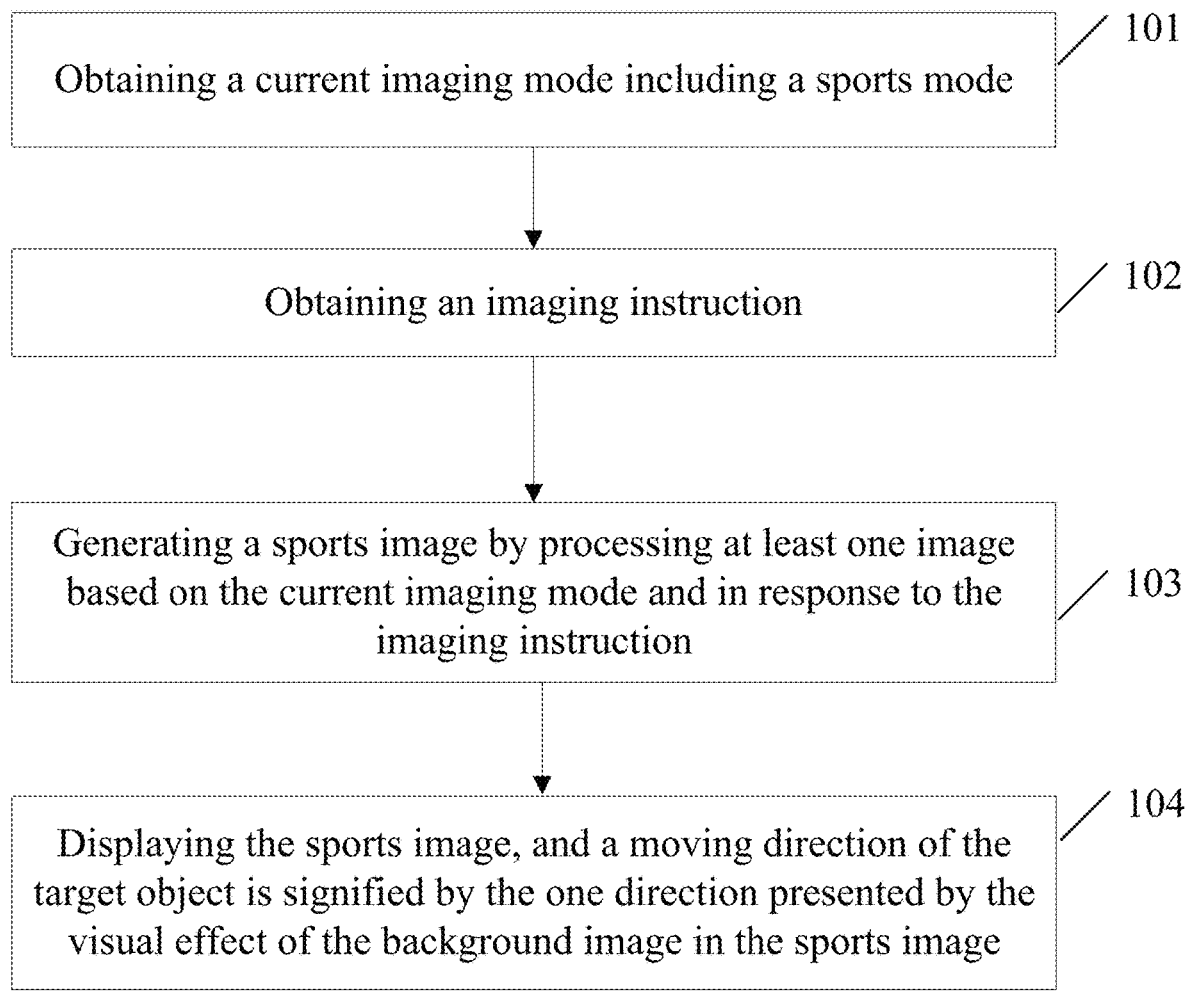
FIG. 1 illustrates a flow chart of an imaging method consistent with some embodiments of the present disclosure.

The present disclosure provides an imaging method consistent with some embodiments of the present disclosure. The imaging method may be applied to an electronic device. The electronic device may not be limited to a smart phone, a tablet, and various normal/dedicated camera equipment. The imaging method in the present disclosure may reduce the difficulties and complexities for imaging a moving subject in a follow-up shooting where a camera needs to keep a same line speed or a same angular velocity as the moving subject in order to image the moving subject in a conventional method. FIG. 1 illustrates a flow chart of the imaging method consistent with some embodiments of the present disclosure. The imaging method may include the following.

In 101: Obtaining a current imaging mode. The current imaging mode may be set as a sports mode, also referred to as an "activity" mode. The current imaging mode may be a mode indicated by an instruction triggered by performing a corresponding mode selection/switching operation. For example, the user may trigger the desired mode (such as the sports mode) by operating a virtual key or a physical key of the electronic device. The electronic device may obtain the current imaging mode based on the received instruction after receiving the instruction triggered by the mode selection/switching operation of the user.

In another embodiment, the current imaging mode may be an imaging mode in which the electronic device is automatically adjusted to be adapted to the current imaging demand. When previewing the image, the current imaging mode may be automatically adjusted to the sports mode in response to detecting a moving object in the image.

For the imaging demand of the moving subject, the electronic device may need to first obtain the current imaging mode, for example, the sports mode. The imaging process of the moving subject may be performed in the sports mode.

In 102: Obtaining an imaging instruction. The imaging instruction may be an instruction triggered by performing a corresponding imaging operation in the sports mode. For example, the imaging instruction may be triggered by pressing the virtual shutter button on a display screen of the electronic device, or may be triggered by pressing the physical key on one side of the electronic device. In one embodiment, the imaging instruction may instruct the electronic device to take an image of the moving subject in the sports mode.

In 103: Generating and saving a sports image by processing at least one image based on the current imaging mode in response to the imaging instruction. The sports image, also referred to as an "activity image", may include a target subject and a background image. The visual effect of at least a portion of the background image is directional.

After the electronic device receives the imaging instruction in the sports mode, the electronic device may perform a corresponding imaging process on the moving subject in response to the instruction. For example, the imaging process performed on the moving subject may include processing at least one image, and generating and saving the sports image including the target subject and the background image. The visual effect of at least a portion of the background image is directional.

In one embodiment, the at least one image may be obtained in response to the imaging instruction. In another embodiment, the at least one image may be obtained in a period of time after or before responding to the imaging instruction. In certain embodiments, the at least one image may be obtained by a combination of any of the above.

For example, in one embodiment, the at least one image may be an image captured by the electronic device at the time of receiving the imaging instruction. In another embodiment, the at least one image may be at least one image having a better imaging effect selected from a set of images captured by the electronic device in a period of time after receiving the imaging instruction. In certain embodiments, after receiving the imaging instruction, the electronic device may store the cached preview images before receiving the instruction and the images captured after receiving the instruction as a set of images. The at least one image may be at least one image having a better imaging effect selected from the set of images.

The target object in the sports image obtained after processing at least one image may be an image corresponding to the moving subject in the shooting scene. The background image in the sports image may be an image corresponding to the other part other than the moving subject in the shooting scene. The visual effect of at least a portion of the background image is directional. For example, the at least a portion of the background image may exhibit a visual effect in certain direction, such as a horizontal direction, a vertical direction, and a diagonal direction, etc.

In 104: Displaying the sports image. The sports image may illustrate the moving direction of the target object signified by the direction presented by the visual effect of the background image. The sports image is displayed on the basis of processing to obtain the sports image.

In the present disclosure, the visual effect of at least a portion of the background image in the sports image is directional by performing the imaging process. Further, the moving direction of the target object may be signified by the direction presented by the visual effect of at least a portion of the background image in response to displaying the sports image. Therefore, an image of the moving subject having a movement effect can be captured without the follow-up shooting.

According to the imaging method provided in the above embodiments of the present disclosure, the sports image may be generated and saved by processing at least one image in response to receiving the imaging instruction in the sports mode. The sports image may include the target object and the background image. The visual effect of at least a portion of the background image is directional. Then the sports image may be displayed. The sports image may illustrate the moving direction of the target object signified by the direction presented by the visual effect of the background image. Thus, in the present disclosure, the visual effect of at least a portion of the background image in the generated sports image is directional by processing at least one image. Further, the moving direction of the target object may be signified by the direction presented by the visual effect of at least a portion of the background image. Therefore, by using the imaging method in the present disclosure, the moving subject is captured without the follow-up shooting. The difficulties and complexities for imaging the moving subject may be effectively reduced.

Figure 2:
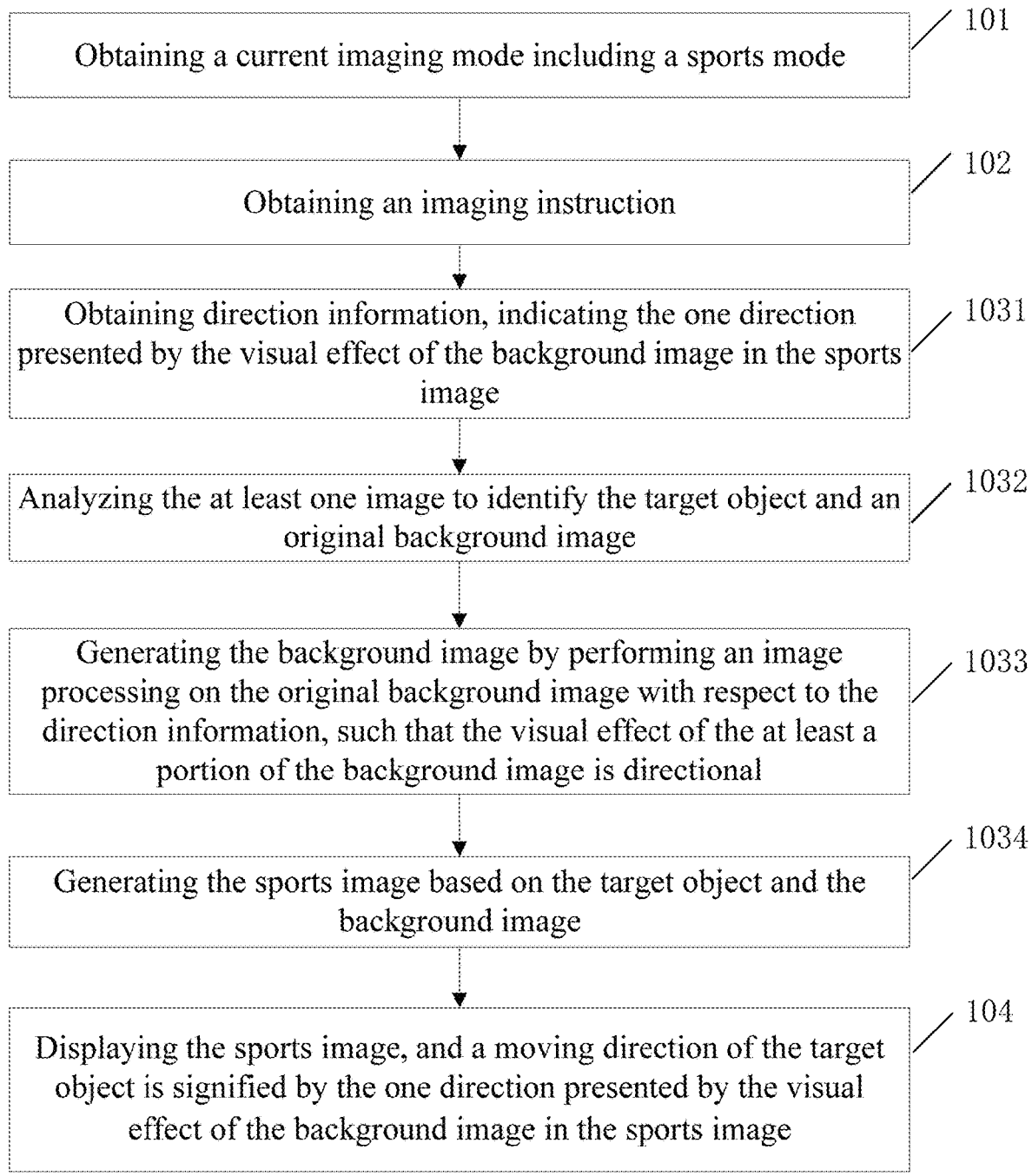
FIG. 2 illustrates a flow chart of another imaging method consistent with some embodiments of the present disclosure.

FIG. 2 illustrates a flow chart of another imaging method consistent with some embodiments of the present disclosure. Referring to FIG. 2, generating and saving a sports image by processing at least one image based on the current imaging mode in response to the imaging instruction in 103 may be implemented by the following.

In 1031: Obtaining direction information. The direction information may indicate the direction presented by the visual effect of the background image in the sports image.

When the number of images in the at least one image is not less than two, the moving direction of the target object in the image directly captured by analyzing the not less than two images may be the direction information.

In one embodiment, in response to performing the imaging process on a driving car in the current scene, at least two images may be captured with one camera. In view of the movement characteristics of the car and the shooting delay between different images imaged with the same one camera, the position information of the car in the different captured images may be changed. Therefore, the movement direction of the car can be obtained by analyzing the position change of the car in the at least two images.

In another embodiment, direction indication information may be obtained as the direction information. The direction indication information may be the information generated based on a user's input operation. In one embodiment, the direction indication information may be the information generated by obtaining a user's input operation before obtaining the imaging instruction. In another embodiment, the direction indication information may be the information generated by displaying a user input prompt interface in response to processing and generating the sports image.

Figure 3:
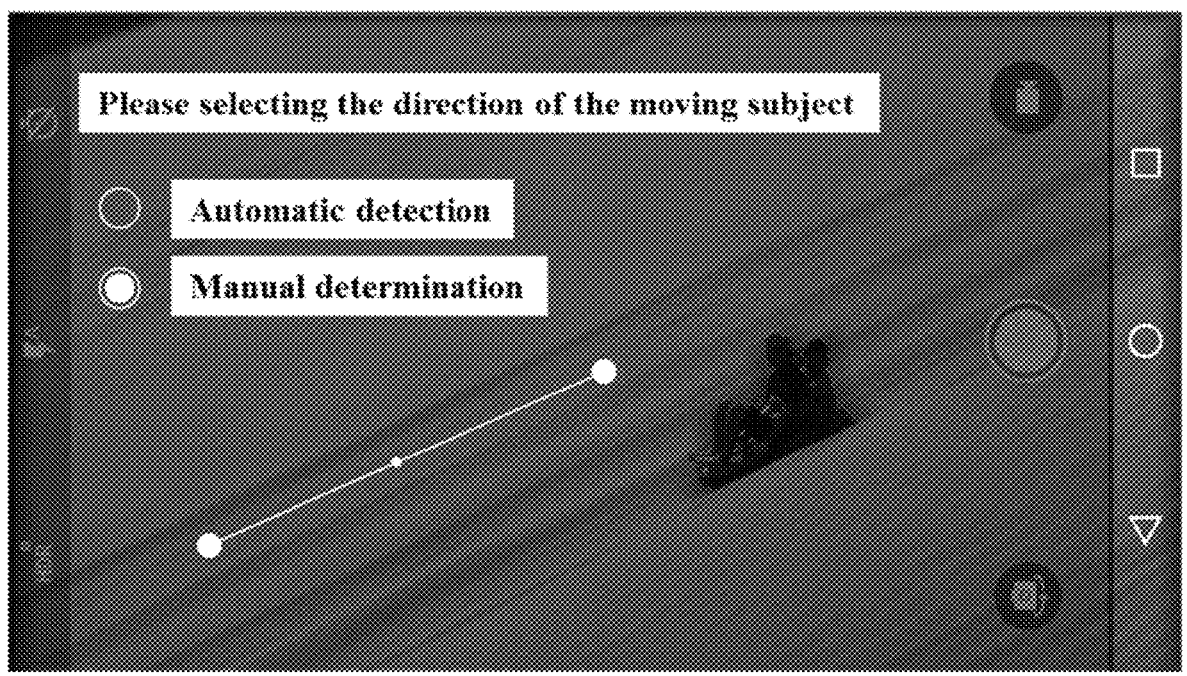
FIG. 3 illustrates a schematic diagram of a direction information input interface consistent with some embodiments of the present disclosure.

In one embodiment, in a short preset time before pressing the shutter, according to the actual moving direction of the moving subject, a user may operate the electronic device to have a small amplitude of movement in the moving direction. Therefore, the electronic device may use a corresponding motion sensor, such as an acceleration sensor, to detect the moving direction of the motion before pressing the shutter. Thus, the direction indication information may be obtained. In another embodiment, referring to FIG. 3, a prompt interface as illustrated in FIG. 3 may be displayed to prompt a user to input the direction information, such as a line having a certain direction, etc., coinciding with the moving direction of the moving subject/target object in response to processing and generating the sports image. The electronic device can obtain the direction indication information based on the inputted direction information.

In 1032: Analyzing the at least one image to identify the target object and the original background image. In one embodiment, based on the focusing information or the depth information of the at least one image, or based on a change of different images in the at least one image, and in conjunction with a corresponding image edge detection algorithm, the at least one image may be analyzed to identify the target object corresponding to the moving subject. Further, the original background image in the at least one image may be identified based on the identified target object.

In 1033: Performing an image processing on the original background image based on the direction information to generate the background image, such that the visual effect of at least a portion of the background image is directional.

On the basis of obtaining the direction information and identifying the original background image, the image processing may be performed on the original background image with respect to the direction information to obtain the background image. For example, at least a portion of the processed background image may exhibit a blur effect having a certain direction, or may exhibit a texture effect having a certain direction.

In 1034: Generating the sports image based on the target object and the background image. The sports image may be generated by performing a corresponding process on the target object and the background image, such as combining the target object and the background image, etc.

The distinction between the target object and the background image may be determined according to the context in the image. For example, in a front-back direction of the image, based on the focusing information and/or the depth information in the image, a hierarchical relationship of "levels"/"layers" in the image along a depth from the front to the back of the image may be obtained. The hierarchical relationship may include a depth level of the target object in the image, and also a foreground level and a background level of this depth level of the target object. This depth level of the target object is between the foreground level and the background level along the front-back direction.

Additionally and optionally, the distinction between the target object and the background image may be determined according to distinctions between different parts of the target object in parallel along a same depth level of the target object.

As such, the target object may be distinguished from the background image by distinguishing the depth level of the target object from its corresponding foreground level and background level along a front-back direction of the image, and/or by distinguishing parallel parts of the target object along a same depth level of the target object in the image.

Figure 4:
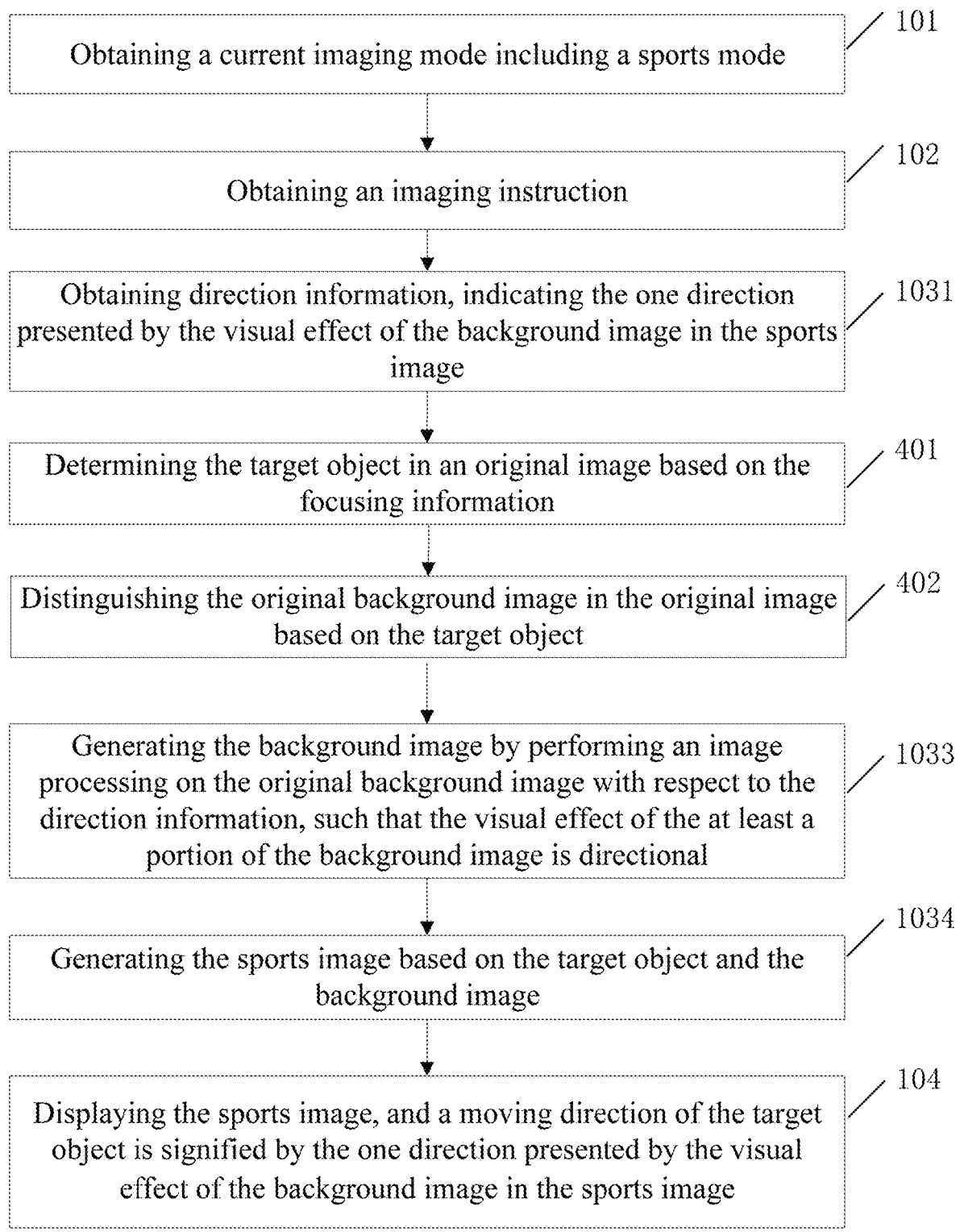
FIG. 4 illustrates a flow chart of another imaging method consistent with some embodiments of the present disclosure.

FIG. 4 illustrates a flow chart of another imaging method consistent with some embodiments of the present disclosure. In one embodiment, referring to FIG. 4, analyzing at least one image to identify the target object and the original background image in 1032 may be implemented by the following.

In 401: Determining the target object in an original image based on the focusing information. The at least one image may be the original image.

In 402: Distinguishing the original background image in the original image based on the target object.

Figure 5:
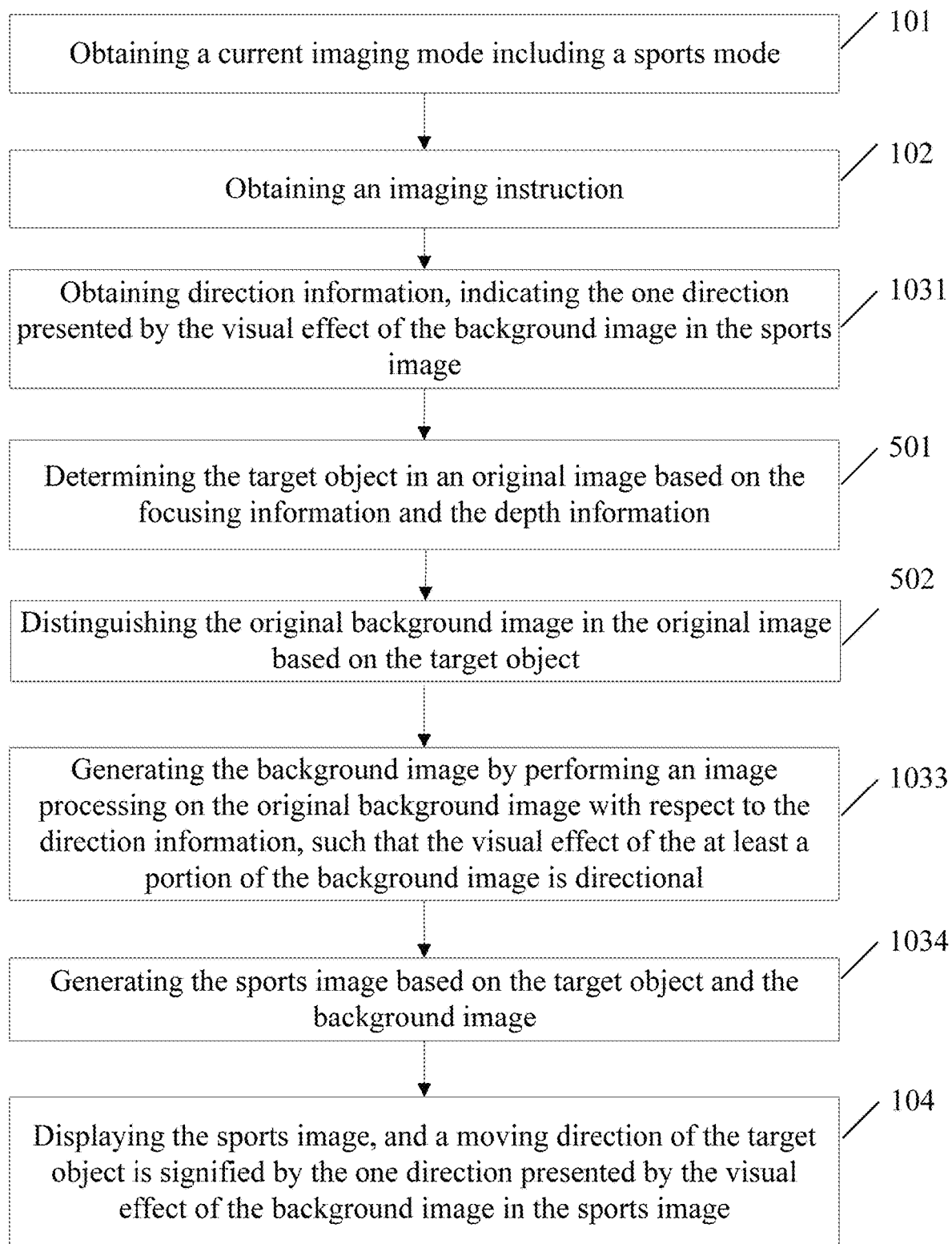
FIG. 5 illustrates a flow chart of another imaging method consistent with some embodiments of the present disclosure.

FIG. 5 illustrates a flow chart of another imaging method consistent with some embodiments of the present disclosure. In another embodiment, referring to FIG. 5, analyzing at least one image to identify the target object and the original background image in 1032 may be implemented by the following.

In 501: Determining the target object in an original image based on the focusing information and the depth information. The at least one image may be the original image.

In 502: Distinguishing the original background image in the original image based on the target object.

In the present disclosure, the at least one image may be a detailed one image (the original image). The target object and the original background image in the original image may be identified through the processing processes provided in FIG. 4 and FIG. 5.

In one embodiment, the original image may be captured in response to the imaging instruction by the electronic device, the camera. In another embodiment, the original image may be captured in a period of time after or before responding to the imaging instruction. In a case where a set of images are captured in response to the imaging instruction, the original image may preferably be an image with the best image quality in the set of images.

Referring to FIG. 4, the target object (corresponding to the moving subject) in the original image may be determined based on the focusing information, and the other part other than the target object in the original image may be recognized as the original background image.

In one embodiment, a portion of the original image with the clearest image corresponding to the focus point may be determined based on the focusing information of the camera. In conjunction with a certain image edge detection algorithm, the target object may be identified from the portion or a certain image area where the portion is centered. The portion of the original image other than the target object may be the original background image.

In another embodiment, referring to FIG. 5, the target object in the original image may be determined based on the focusing information and the depth information. Further, the portion of the original image other than the target object may be the original background image.

For example, the depth information may be obtained by many methods. In one embodiment, an additional depth camera and a camera used in the auxiliary sports mode may be used to directly obtain the depth information of the image to be processed (such as the original image) taken with sports mode. In another embodiment, an additional general camera in conjunction with the camera used in the auxiliary sports mode may be used to analyze the depth information of the image to be processed (the original image) based on the imaging difference information of the two images simultaneously taken by the two cameras.

In response to using the general camera in conjunction with the camera used in the sports mode, the position deviation information of same two pixels in the two images taken at the same time by the two cameras may be used to obtain the corresponding depth information of the same two pixels, thus the depth information of the image to be processed in the sports mode may be obtained. The same two pixels in the two images may be referred to two pixels where difference between values of the pixels in the same position area with predetermined size of the two images is below the predetermined threshold.

After obtaining the depth information of the image to be processed (the original image), based on the depth information and the focusing information of the original image, the image area in the original image corresponding to the imaged portion located in the object side of focal plane in the shooting scene may be determined. Based on this, the target object, that is, an image portion corresponding to the moving subject, may be identified from the image area by using a certain image edge detection algorithm. Further, the other portion other than the target object may be identified as the original background image.

Compared to the method for identifying the target object and the original background image based on the focusing information, the method for identifying the target object and the original background image based on the focusing information and the depth information may have higher recognition accuracy, while may have higher complexities. In response to using the method in the present disclosure, the identification of the target object and the original background image may be performed by a suitable method according to the actual demand.

Figure 6:
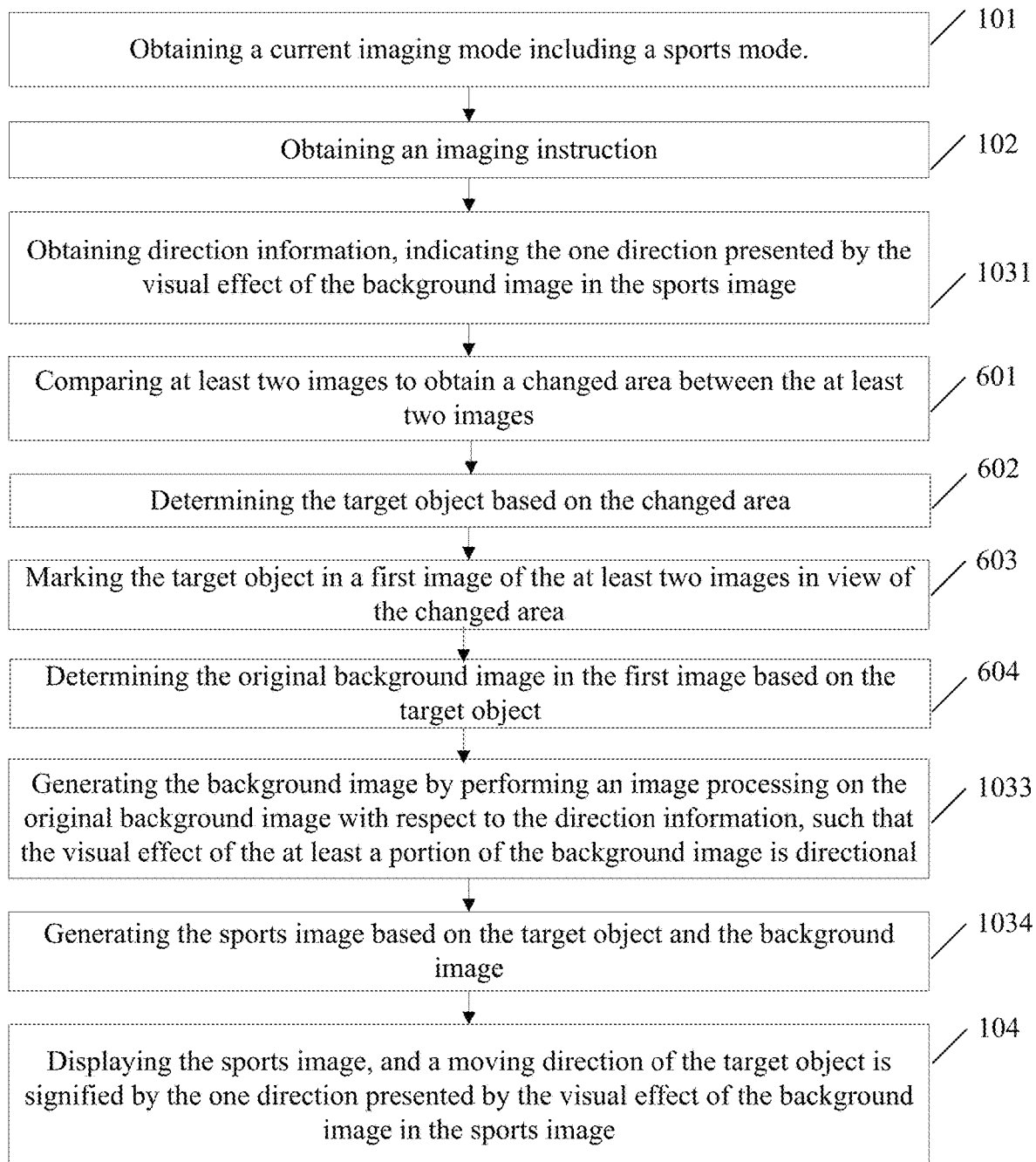
FIG. 6 illustrates a flow chart of another imaging method consistent with some embodiments of the present disclosure.

FIG. 6 illustrates a flow chart of another imaging method consistent with some embodiments of the present disclosure. In one embodiment, referring to FIG. 6, analyzing at least one image to identify the target object and the original background image in 1032 may be implemented by the following.

In 601: Comparing at least two images to obtain a changed area between the at least two images;

In 602: Determining the target object based on the changed area;

In 603: Marking the target object in a first image of the at least two images; and In 604: Determining the original background image in the first image based on the target object.

The present disclosure provides an implementation process for identifying the target object and the original background image in the first image of the at least two images in a case where the at least one image is at least two images.

In one embodiment, the at least two images may be captured in response to the imaging instruction by the electronic device, the camera. In another embodiment, the at least two images may be captured in a period of time after or before responding to the imaging instruction. In certain embodiments, the at least two images may be captured by a combination of any of the above. In a case where a set of images are captured in response to the imaging instruction, the at least two images may preferably be two images with the best image quality in the set of images. The first image in the at least two images may be an image with the best image quality in the at least two images. Therefore, the present disclosure realizes the identification of the target object and the original background image in the first image by using one camera.

In the present disclosure, the target object may correspond to the moving subject in the shooting scene. In view of the movement characteristics of the moving subject and the shooting delay between different images taken by the same camera, there is a changed area due to the movement of the moving subject in the at least two images captured by the same camera.

Based on this, the present disclosure obtains the changed area of the at least two images by comparing the at least two images. The target object may be determined based on the changed area. The changed area may indicate an area in the original background image. Further, the target object may be marked in the first image of the at least two images. The portion other than the target object marked in the first image may be identified as the original background image. Therefore, the recognition of the target object and the original background image may be achieved.

In one embodiment, analyzing at least one image to identify the target object and the original background image in 1032 may be implemented by the following: analyzing the at least one image to obtain two analysis results. One analysis result may be to identify the target object and the original background image, and another analysis result may be to identify the moving direction of the target object.

In other words, the present disclosure obtains two analysis results by performing one analysis process on the at least one image. One analysis result may be to identify the target object and the original background image, and another analysis result may be to identify the moving direction of the target object. The detailed analysis process in the present disclosure may be similar to that in the above embodiment where two analysis processes may be performed on the at least one image to obtain the two analysis results. The same or similar parts in the present embodiment are not repeated herein, and the difference may include that the present disclosure obtains the two analysis results by performing one analysis process, rather than by performing two independent analysis processes.

Compared to the above embodiment where the two analysis processes are performed on the at least one image to obtain the two analysis results, the present disclosure performs one analysis process on the at least one image to obtain the two analysis results. Thus, the image processing efficiency in response to imaging the moving subject can be further improved.

Figure 7:
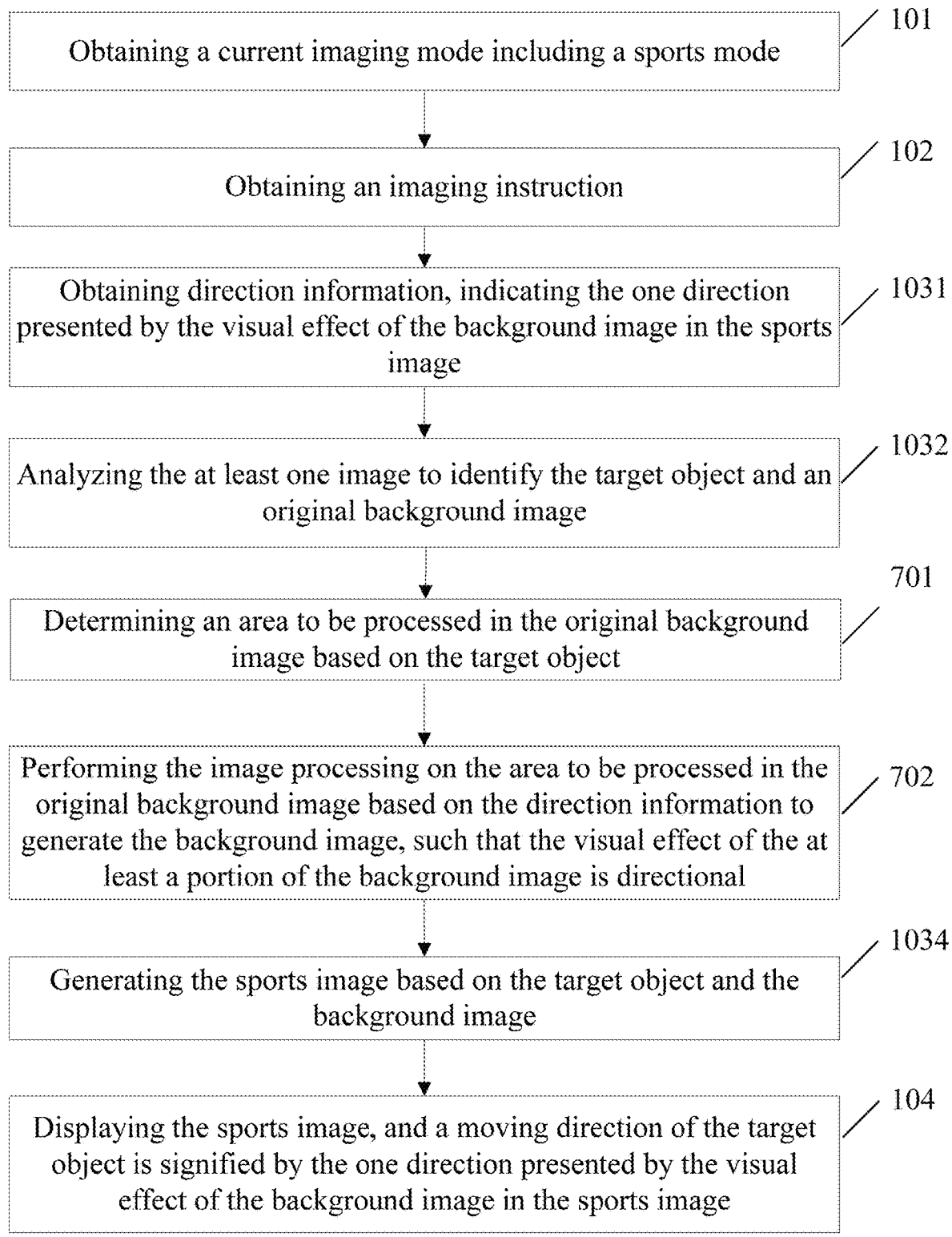
FIG. 7 illustrates a flow chart of another imaging method consistent with some embodiments of the present disclosure.

FIG. 7 illustrates a flow chart of another imaging method consistent with some embodiments of the present disclosure. In one embodiment, referring to FIG. 7, performing the image processing on the original background image based on the direction information to generate the background image in 1033 may be implemented by the following.

In 701: Determining an area to be processed in the original background image based on the target object; and In 702: Performing the image processing on the area to be processed in the original background image with respect to the direction information to generate the background image, such that the visual effect of at least a portion of the background image is directional.

The area to be processed may be an entire area of the original background image, or may be a partial area of the original background image. In one embodiment, the entire area of the original background image may be the area to be processed. The area to be processed may be treated as a blurred visual effect having a certain direction with respect to the direction information. The direction characteristic of the area to be processed having blurred visual effect may coincide with the direction information.

Figure 8:
FIG. 8 (a) illustrates a schematic diagram of an image to be processed consistent with some embodiments of the present disclosure.
Figure 8:
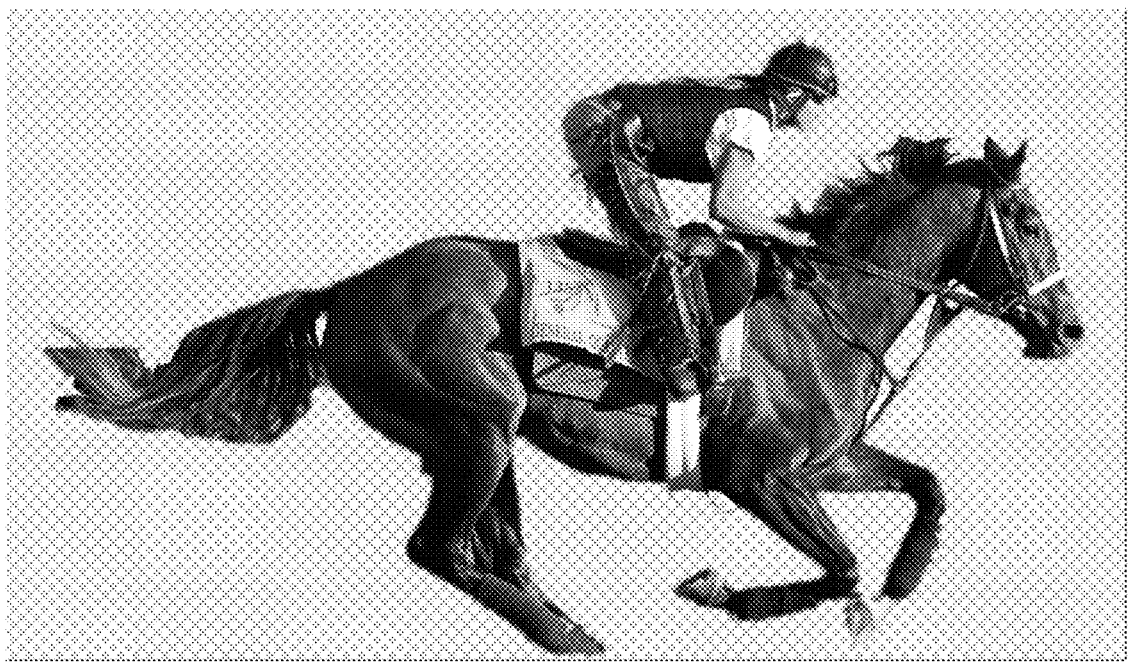
Figure 8:
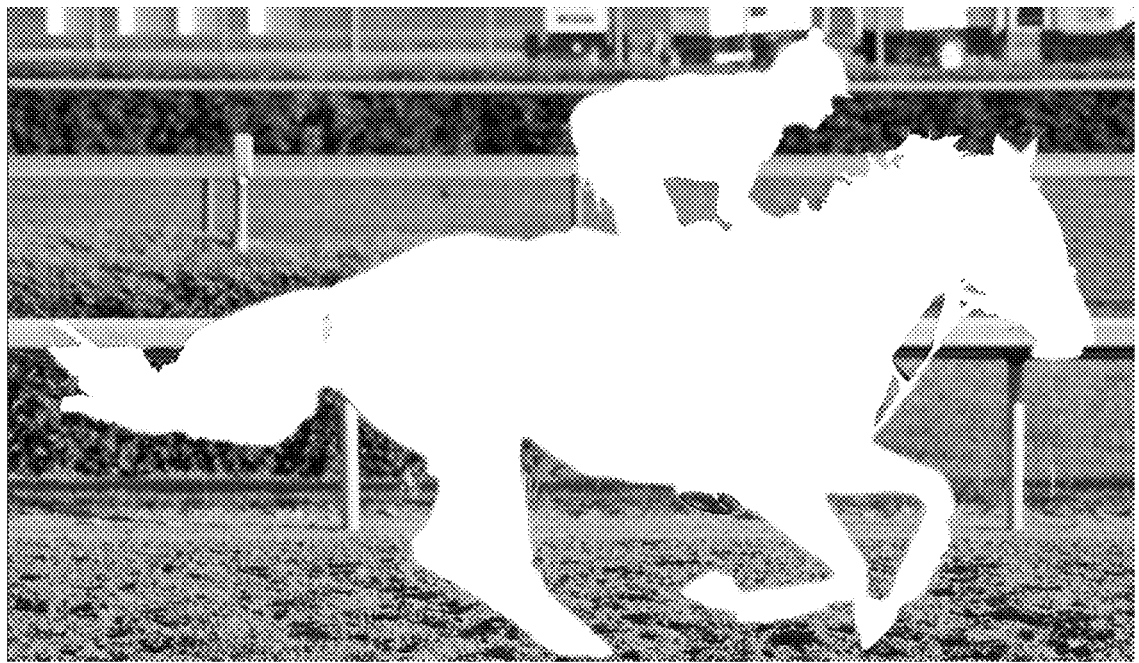
Figure 8:
Figure 8:

The image illustrated in FIG. 8 (*a*) is used as an example. The at least one image processed in the sports mode in the present disclosure may be the image illustrated in FIG. 8 (*a*). For the image illustrated in FIG. 8 (*a*), the target object and the original background image may be identified by the imaging method in the present disclosure, and may be the images illustrated in FIG. 8 (*b*) and FIG. 8 (*c*), respectively. The moving direction of the target object may be horizontal. Before processing the recognized original background image, a matting process may be first performed. For example, in one embodiment, the target object may be plucked out from the image illustrated in FIG. 8 (*a*), and the remaining part may be the original background image illustrated in FIG. 8 (*c*). In another embodiment, the original background image may be plucked out directly from the image illustrated in FIG. 8 (*a*) to obtain the FIG. 8 (*c*). Then, a blurring process having horizontal visual effect may be performed on the original background image illustrated in FIG. 8 (*c*) to obtain the background image illustrated in FIG. 8 (*d*). Based on this, a sports image illustrated in FIG. 8 (*e*) may be obtained by combining the background image having horizontal visual effect illustrated in FIG. 8 (*d*) and the target object illustrated in FIG. 8 (*b*). When subsequently displaying the sports image illustrated in FIG. 8 (*e*), the horizontal movement effect of the target object (man riding on the horse) may be signified by the horizontal blurring visual effect of the background image.

Figure 9:
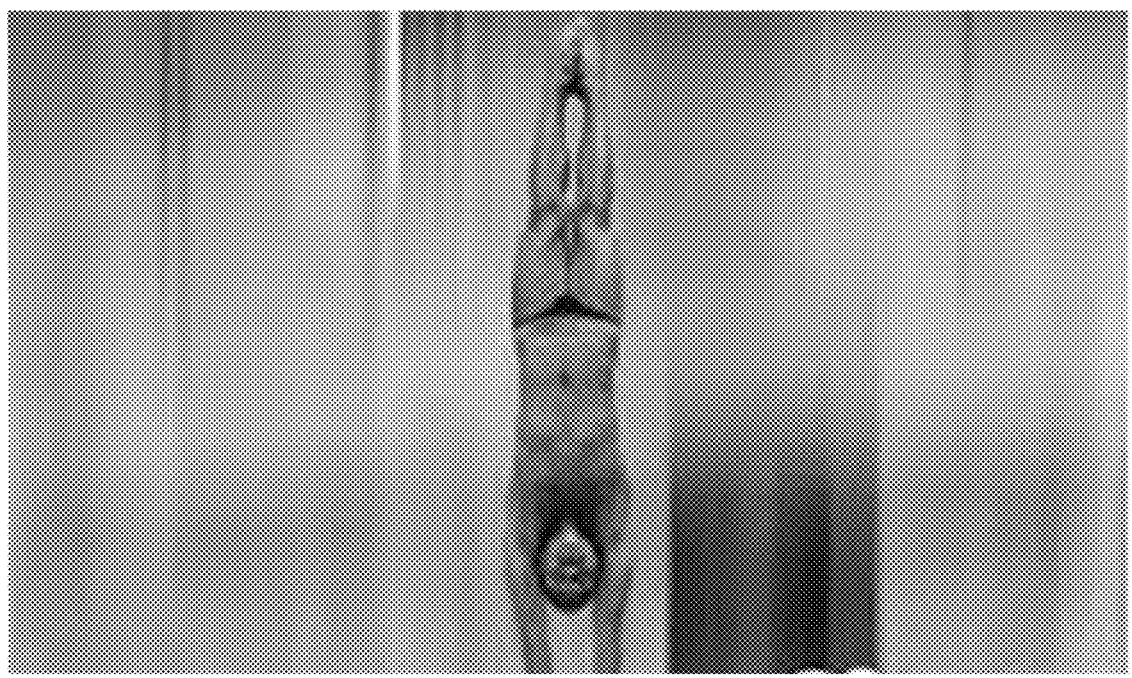
FIG. 9 (a) illustrates a schematic diagram of a sports image having a vertical movement effect consistent with some embodiments of the present disclosure.
Figure 9:

FIG. 9 (*a*) illustrates a schematic diagram of a moving subject having a vertical movement effect captured by the above-described processes. FIG. 9 (*b*) illustrates a schematic diagram of a moving subject having an oblique movement effect captured by the above-described processes.

In another embodiment, a partial area of the original background image may be referred as the area to be processed. The area to be processed may exhibit a texture effect having a certain direction after processing with respect to the direction information. The direction characteristic of the area to be processed having texture visual effect may coincide with the direction information.

The partial area as the area to be processed may preferably be a partial area adjacent to the target object in the original background image. In one embodiment, a moving car is described as an example. The area to be processed may be an area adjacent to the tail portion of the car, or may be an area adjacent to the side portion of the car in the original background image. The horizontal movement of the car in the obtained sports image may be signified by a horizontal texture effect of the background image by adding a texture having a horizontal effect in the area to be processed (the moving direction of the car is horizontal), such as adding a horizontal texture having a tailing effect in the partial area adjacent to the tail of the car.

Figure 10:
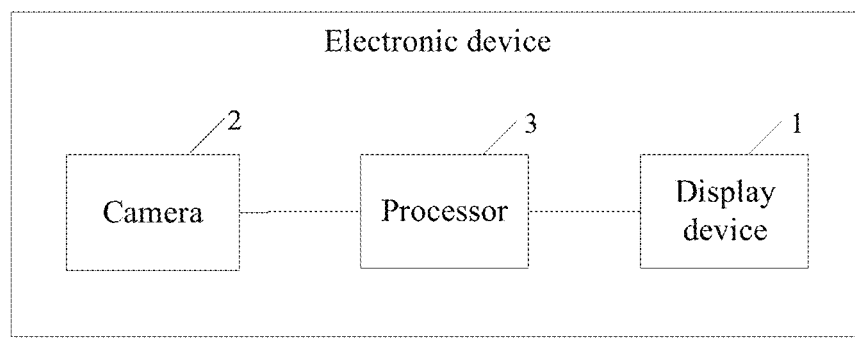
FIG. 10 illustrates a structural diagram of an electronic device consistent with some embodiments of the present disclosure.

The present disclosure provides an electronic device. The electronic device may not be limited to a smart phone, a tablet, and various normal/dedicated camera equipment. The imaging method in the present disclosure may reduce the difficulties and complexities for imaging a moving subject in a follow-up shooting where a camera needs to keep a same line speed or a same angular velocity as the moving subject in response to imaging the moving subject in a conventional method. FIG. 10 illustrates a structural diagram of the electronic device consistent with some embodiments of the present disclosure.

The electronic device may include a display device 1, a camera 2, and a processor 3. The camera 2 may capture at least one image. The processor 3 may obtain a current imaging mode including a sports mode. The processor 3 may also obtain an imaging instruction. In addition, the processor 3 may generate and save a sports image by processing at least one image based on the current imaging mode and in response to the imaging instruction. The sports image may include a target subject and a background image. The visual effect of at least a portion of the background image is directional. Further, the processor 3 may display the sports image by the display device. The sports image may illustrate a moving direction of the target object signified by the one direction presented by the visual effect of the background image in the sports image.

The current imaging mode may be a mode indicated by an instruction triggered by performing a corresponding mode selection/switching operation. For example, the user may trigger the desired mode (such as the sports mode) by operating a virtual key or a physical key of the electronic device. The electronic device may obtain the current imaging mode based on the received instruction after receiving the instruction triggered by the mode selection/switching operation.

In another embodiment, the current imaging mode may be an imaging mode in which the electronic device is automatically adjusted to be adapted to the current imaging demand. In response to previewing the image, the current imaging mode may be automatically adjusted to the sports mode in response to detecting a moving object in the image.

For the imaging demand of the moving subject, the electronic device may need to first obtain the current imaging mode, which is the sports mode. The imaging process of the moving subject may be performed in the sports mode.

The imaging instruction may be an instruction triggered by performing a corresponding imaging operation in the sports mode. For example, the imaging instruction may be triggered by pressing the virtual shutter button on a display screen of the electronic device, or may be triggered by pressing the physical key on one side of the electronic device. In one embodiment, the imaging instruction may instruct the electronic device to take an image of the moving subject in the sports mode.

After the electronic device receives the imaging instruction in the sports mode, the electronic device may perform a corresponding imaging process on the moving subject in response to the instruction. For example, the imaging process performed on the moving subject may include processing at least one image, and generating and saving the sports image including the target subject and the background image. The visual effect of at least a portion of the background image is directional.

In one embodiment, the at least one image may be obtained in response to the imaging instruction. In another embodiment, the at least one image may be obtained in a period of time after or before responding to the imaging instruction. In certain embodiments, the at least one image may be obtained by a combination of any of the above.

For example, in one embodiment, the at least one image may be one image captured by the electronic device at the time of receiving the imaging instruction. In another embodiment, the at least one image may be at least one image having a better imaging effect selected from a set of images captured by the electronic device in a period of time after receiving the imaging instruction. In certain embodiments, in response to receiving the imaging instruction, the electronic device may store the cached preview images before receiving the instruction and the images captured after receiving the instruction as a set of images. The at least one image may be at least one image having a better imaging effect selected from the set of images.

The target object in the sports image obtained after processing at least one image may be an image corresponding to the moving subject in the shooting scene. The background image in the sports image may be an image corresponding to the other part other than the moving subject in the shooting scene. The visual effect of at least a portion of the background image is directional. For example, the at least a portion of the background image may exhibit a visual effect in certain direction, such as a horizontal direction, a vertical direction, and a diagonal direction, etc. The processor 3 may control the display device 1 to display the sports image on the basis of processing to obtain the sports image.

In the present disclosure, the visual effect of at least a portion of the background image in the sports image is directional by performing the imaging process. Further, in response to displaying the sports image, the moving direction of the target object may be signified by the direction presented by the visual effect of at least a portion of the background image. Therefore, an image of the moving subject having a movement effect can be captured without the follow-up shooting.

According to the above embodiments, the electronic device in the present disclosure may generate and save the sports image by processing at least one image in response to receiving the imaging instruction in the sports mode. The sports image may include the target object and the background image. The visual effect of at least a portion of the background image is directional. Then the sports image may be displayed. The sports image may illustrate the moving direction of the target object signified by the direction presented by the visual effect of the background image. Thus, in the present disclosure, the visual effect of at least a portion of the background image in the generated sports image is directional by processing at least one image. Further, the moving direction of the target object may be signified by the direction presented by the visual effect of at least a portion of the background image. Therefore, by using the imaging method in the present disclosure, the moving subject is captured without the follow-up shooting. The difficulties and complexities for imaging the moving subject may be effectively reduced.

In the present disclosure, the processor 3 may generate the sports image on the basis of processing at least one image in the sports mode. The processor 3 may obtain the direction information. The direction information may indicate the direction presented by the visual effect of the background image in the sports image. The processor 3 may also analyze the at least one image to identify the target object and the original background image, and perform an image processing on the original background image with respect to the direction information to generate the background image. The visual effect of at least a portion of the background image is directional. Further, the processor 3 may generate the sports image based on the target object and the background image.

When the number of images in the at least one image is not less than two, the moving direction of the target object in the images directly captured by analyzing the not less than two images may be set as the direction information.

In one embodiment, in response to performing the imaging process on a driving car in the current scene, at least two images may be captured with one camera. In view of the movement characteristics of the car and the shooting delay between different images imaged with the same one camera, the position information of the car in the different captured images may be changed. Therefore, the moving direction of the car can be obtained by analyzing the position change of the car in the at least two images.

In another embodiment, direction indication information may be obtained as the direction information. The direction indication information may be the information generated based on a user's input operation. In one embodiment, the direction indication information may be the information generated by obtaining a user's input operation before obtaining the imaging instruction. In another embodiment, the direction indication information may be the information generated by displaying a user input prompt interface in response to processing and generating the sports image.

In one embodiment, in a short preset time before pressing the shutter, according to the actual moving direction of the moving subject, a user may operate the electronic device to have a small amplitude of movement in the moving direction. Therefore, the electronic device may use a corresponding motion sensor, such as an acceleration sensor, to detect the moving direction of the motion before pressing the shutter. Thus, the direction indication information may be obtained. In another embodiment, referring to FIG. 3, a prompt interface as illustrated in FIG. 3 may be displayed to prompt the user to input the direction information, such as a line having a certain direction, etc., coinciding with the moving direction of the moving subject/target object in response to processing and generating the sports image. Thus, the electronic device can obtain the direction instruction information based on the inputted direction information.

In one embodiment, based on the focusing information or the depth information of the at least one image, or based on a change of different objects in the at least one image, and in conjunction with a corresponding image edge detection algorithm, the at least one image may be analyzed to identify the target object corresponding to the moving subject. Further, the original background image in the at least one image may be identified based on the identified target object.

On the basis of obtaining the direction information and identifying the original background image, the image processing may be performed on the original background image with respect to the direction information to obtain the background image. For example, at least a portion of the processed background image may exhibit a blur effect having a certain direction, or may exhibit a texture effect having a certain direction.

The sports image may be generated by performing a corresponding process on the target object and the background image, such as combining the target object and the background image, etc.

The distinction between the target object and the background image may be determined according to the context in the image. For example, in a front-back direction of the image, based on the focusing information and/or the depth information in the image, a hierarchical relationship of "levels"/"layers" in the image along a depth from the front to the back of the image may be obtained. The hierarchical relationship may include a depth level of the target object in the image, and also a foreground level and a background level of this depth level of the target object. This depth level of the target object is between the foreground level and the background level along the front-back direction.

Additionally and optionally, the distinction between the target object and the background image may be determined according to distinctions between different parts of the target object in parallel along a same depth level of the target object. As such, the target object may be distinguished from the background image by distinguishing the depth level of the target object from its corresponding foreground level and background level along a front-back direction of the image, and/or by distinguishing parallel parts of the target object along a same depth level of the target object in the image.

In the present disclosure, the processor 3 may analyze at least one image to identify the target object and the original background image. In one embodiment, the processor 3 may determine a target object in an original image based on the focusing information. The at least one image may be the original image. The processor 3 may also distinguish the original background image in the original image based on the target object.

In another embodiment, the processor 3 may determine the target object in the original image based on the focusing information and the depth information. The at least one image may be the original image. The processor 3 may also determine the original background image in the original image based on the target object.

In the present disclosure, the at least one image may be a detailed one image (the original image). The target object and the original background image in the original image may be identified through any one of the above two processing processes.

In one embodiment, the original image may be captured in response to the imaging instruction by the electronic device, the camera. In another embodiment, the original image may be captured in a period of time after or before responding to the imaging instruction. In a case where a set of images are obtained in response to the imaging instruction, the original image may preferably be an image with the best image quality in the set of images.

In one embodiment, the target object (corresponding to the moving subject) in the original image may be determined based on the focusing information, and the other part other than the target object in the original image may be recognized as the original background image.

In one embodiment, a portion of the original image with the clearest image corresponding to the focus point may be determined based on the focusing information of the camera. In conjunction with a certain image edge detection algorithm, the target object may be identified from the portion or a certain image area where the portion is centered. The portion of the original image other than the target object may be the original background image.

In another embodiment, the target object in the original image may be determined based on the focusing information and the depth information. Further, the portion of the original image other than the target object may be the original background image.

The depth information may be obtained by many methods. In one embodiment, an additional depth camera and a camera used in the auxiliary sports mode may be used to directly obtain the depth information of the image to be processed (such as the original image) taken with sports mode. In another embodiment, an additional general camera in conjunction with the camera used in the sports mode may be used to analyze the depth information of the image to be processed (the original image) based on the imaging difference information of the two images simultaneously taken by the two cameras.

In response to using the general camera in conjunction with the camera used in the sports mode, the position deviation information of same two pixels in the two images taken at the same time by the two cameras may be used to obtain the corresponding depth information of the same two pixels, thus the depth information of the image to be processed in the sports mode may be obtained. The same two pixels in the two images may be referred to two pixels where difference between values of the pixels in the same position area with predetermined size of the two images is below the predetermined threshold.

After obtaining the depth information of the image to be processed (the original image), based on the depth information and the focusing information of the original image, the image area in the original image corresponding to the imaged portion located in the object side of focal plane in the shooting scene may be determined. Based on this, the target object, that is, an image portion corresponding to the moving subject, may be identified from the image area by using a certain image edge detection algorithm. Further, the other portion other than the target object may be identified as the original background image.

Compared to the method for identifying the target object and the original background image based on the focusing information, the method for identifying the target object and the original background image based on the focusing information and the depth information may have higher recognition accuracy, while may have high complexities. In response to using the method in the present disclosure, the identification of the target object and the original background image may be performed by a suitable method according to the actual demand.

In the present disclosure, the processor 3 may analyze at least one image to identify the target object and the original background image. In one embodiment, the processor 3 may compare at least two images to obtain a changed area between the at least two images. The processor 3 may also determine the target object based on the changed area and mark the target object in a first image of the at least two images. Further, the processor 3 may determine the original background image in the first image based on the target object.

The present disclosure provides an implementation process for identifying the target object and the original background image in the first image of the at least two images in a case where the at least one image is at least two images.

In one embodiment, the at least two images may be captured in response to the imaging instruction by the electronic device, the camera. In another embodiment, the at least two images may be captured in a period of time after or before responding to the imaging instruction. In certain embodiments, the at least two images may be captured by a combination of any of the above. In a case where a set of images are captured in response to the imaging instruction, the at least two images may preferably be two images with the best image quality in the set of images. The first image in the at least two images may be an image with the best image quality in the at least two images. Therefore, the present disclosure realizes the identification of the target object and the original background image in the first image by using one camera.

In the present disclosure, the target object may correspond to the moving subject in the shooting scene. In view of the movement characteristics of the moving subject and the shooting delay between different images taken by the same camera, there is a changed area due to the movement of the moving subject in the at least two images obtained by the same camera.

Based on this, the present disclosure obtains the changed area of the at least two images by comparing the at least two images. The target object may be determined based on the changed area. Further, the target object may be marked in the first image of the at least two images. The portion other than the target object marked in the first image may be identified as the original background image. Therefore, the recognition of the target object and the original background image may be achieved.

In the present disclosure, the processor 3 may analyze at least one image to identify the target object and the original background image. In one embodiment, the processor 3 may analyze the at least one image to obtain two analysis results. One analysis result may be to identify the target object and the original background image, and another analysis result may be to identify the moving direction of the target object.

In other words, the present disclosure obtains two analysis results by performing one analysis process on the at least one image. One analysis result may be to identify the target object and the original background image, and another analysis result may be to identify the moving direction of the target object. The detailed analysis process in the present disclosure may be similar to that in the above embodiment where two analysis processes may be performed on the at least one image to obtain the two analysis results. The same or similar parts in the present embodiment are not repeated herein, and the difference may include that the present disclosure obtains the two analysis results by performing one analysis process, rather than by performing two independent analysis processes.

Compared to the above embodiment where the two analysis processes are performed on the at least one image to obtain the two analysis results, the present disclosure performs one analysis process on the at least one image to obtain the two analysis results. Thus, the image processing efficiency in response to imaging the moving subject can be further improved.

In the present disclosure, the processor may perform the image processing on the original background image with respect to the direction information to generate the background image. In one embodiment, the processor may determine an area to be processed in the original background image based on the target object, and perform the image processing on the area to be processed in the original background image with respect to the direction information to generate the background image. The visual effect of at least a portion of the background image is directional.

The area to be processed may be an entire area of the original background image, or may be a partial area of the original background image. In one embodiment, the entire area of the original background image may be used as the area to be processed. The area to be processed may be treated as a blurred visual effect having a certain direction with respect to the direction information. The direction characteristic of the area to be processed having blurred visual effect may coincide with the direction information.

The image illustrated in FIG. 8 (a) is used as an example. The at least one image processed in the sports mode in the present disclosure may be the image illustrated in FIG. 8 (a). For the image illustrated in FIG. 8 (a), the target object and the original background image may be identified by the imaging method in the present disclosure, and may be the images illustrated in FIG. 8 (b) and FIG. 8 (c), respectively. The moving direction of the target object may be horizontal. Before processing the recognized original background image, a matting process may be first performed. For example, in one embodiment, the target object may be plucked out from the image illustrated in FIG. 8 (a), and the remaining part may be the original background image illustrated in FIG. 8 (c). In another embodiment, the original background image may be plucked out directly from the image illustrated in FIG. 8 (a) to obtain the FIG. 8 (c). Then, a blurring process having horizontal visual effect may be performed on the original background image illustrated in FIG. 8 (c) to obtain the background image illustrated in FIG. 8 (d). Based on this, a sports image illustrated in FIG. 8 (e) may be obtained by combining the background image having horizontal visual effect illustrated in FIG. 8 (d) and the target object illustrated in FIG. 8 (b). When subsequently displaying the sports image illustrated in FIG. 8 (e), the horizontal movement effect of the target object (man riding on the horse) may be signified by the horizontal blurring visual effect of the background image.

FIG. 9 (a) illustrates a schematic diagram of a moving subject having a vertical movement effect captured by the above-described processes. FIG. 9 (b) illustrates a schematic diagram of a moving subject having an oblique movement effect captured by the above-described processes.

In another embodiment, a partial area of the original background image may be treated as the area to be processed. The area to be processed may exhibit a texture effect having a certain direction after processing with respect to the direction information. The direction characteristic of the area to be processed having texture visual effect may coincide with the direction information.

The partial area as the area to be processed may preferably be a partial area adjacent to the target object in the original background image. In one embodiment, a moving car is described as an example. The area to be processed may be an area adjacent to the tail portion of the car, or may be an area adjacent to the side portion of the car in the original background image. The horizontal movement of the car in the obtained sports image may be signified by a horizontal texture effect of the background image by adding a texture having a horizontal effect in the area to be processed (the moving direction of the car is horizontal), such as adding a horizontal texture having a tailing effect in the partial area adjacent to the tail of the car.

According to the above embodiments, the imaging method and electronic device in the present disclosure may generate and save the sports image by processing at least one image in response to receiving the imaging instruction in the sports mode. The sports image may include the target object and the background image. The visual effect of at least a portion of the background image is directional. Then the sports image may be displayed. The sports image may illustrate the moving direction of the target object signified by the direction presented by the visual effect of the background image. Thus, in the present disclosure, the visual effect of at least a portion of the background image in the generated sports image is directional by processing the at least one image. Further, the moving direction of the target object may be signified by the direction presented by the visual effect of at least a portion of the background image. Therefore, by using the imaging method in the present disclosure, the moving subject is captured without the follow-up shooting. The difficulties and complexities for imaging the moving subject may be effectively reduced.

Various embodiments in the present specification are described in a progressive manner. Each embodiment mainly describes in terms of differences from other embodiments, and the same or similar parts between the various embodiments may be referred to each other.

The device and method described in the above embodiments may be realized through other approaches. That is, the description on the methods and devices in the above embodiments may only be schematic examples.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An imaging method, comprising:
   obtaining at least two images;
   comparing the at least two images to detect a changed area between the at least two images;
   detecting, in response to the changed area being detected, a target object based on the changed area;
   determining whether a current imaging mode is an activity mode;
   in response to the target object being detected based on the changed area:
      maintaining the current imaging mode in response to the current imaging mode being the activity mode; and
      adjusting the current imaging mode to the activity mode in response to the current imaging mode not being the activity mode;
   obtaining an imaging instruction;
   generating an activity image by processing the at least two images based on the current imaging mode and in response to the imaging instruction, wherein:
      the activity image includes the target object and a background image, and
      at least a portion of the background image has a visual effect in one direction, the visual effect including a texture effect; and
   displaying the activity image, wherein a moving direction of the target object is signified by the one direction presented by the visual effect of the background image in the activity image.

2. The method according to claim 1, wherein generating the activity image includes:
   obtaining direction information, indicating the one direction presented by the visual effect of the background image in the activity image;
   generating the background image by performing an image processing on original background images with respect to the direction information, such that the visual effect of the at least a portion of the background image is directional; and
   generating the activity image based on the target object and the background image.

3. The method according to claim 2, wherein:
   the target object corresponds to a moving subject in the at least two images; and
   the original background images correspond to other part other than the target object in the at least two images.

4. The method according to claim 2, wherein obtaining the direction information includes:
   analyzing the at least two images to obtain a moving direction of the target object directly as the direction information.

5. The method according to claim 2, wherein obtaining the direction information includes:
   obtaining direction indication information, generated based on a user's input operation, as the direction information.

6. The method according to claim 2, wherein:
   detecting the target object further includes detecting the target object further based on focusing information of the at least two images; and
   generating the activity image further includes distinguishing the original background images in the at least two images based on the target object.

7. The method according to claim 2, wherein:
   detecting the target object further includes detecting the target object further based on focusing information and depth information of the at least two images; and
   generating the activity image further includes distinguishing the original background images in the at least two images based on the target object.

8. The method according to claim 2, further comprising:
   marking the target object in the at least two images in view of the changed area; and
   determining the original background images based on the target object.

9. The method according to claim 2, wherein generating the background image includes:
   determining an area to be processed in the original background images based on the target object; and
   performing the image processing on the area to be processed in the original background images based on the direction information to generate the background image, such that the visual effect of the at least a portion of the background image is directional.

10. An electronic device, comprising:
    a display device;
    a camera, for capturing at least two images; and a processor, connected to the display device and the camera for:
  obtaining the at least two images, comparing the at least two images to detect a changed area between the at least two images;
  detecting, in response to the changed area being detected, a target object based on the changed area;
  determining whether a current imaging mode is an activity mode,
  in response to the target object being detected based on the changed area:
    maintaining the current imaging mode in response to the current imaging mode being the activity mode; and
    adjusting the current imaging mode to the activity mode in response to the current imaging mode not being the activity mode;
  obtaining an imaging instruction,
  generating an activity image by processing the at least two images based on the current imaging mode and in response to the imaging instruction, wherein:
    the activity image includes the target object and a background image, and
    at least a portion of the background image has a visual effect in one direction, the visual effect including a texture effect, and
  displaying the activity image on the display device, wherein a moving direction of the target object is signified by the one direction presented by the visual effect of the background image in the activity image.

11. The electronic device according to claim 10, wherein generating the activity image includes:
  obtaining direction information, indicating the one direction presented by the visual effect of the background image in the activity image;
  generating the background image by performing an image processing on original background images with respect to the direction information, such that the visual effect of the at least a portion of the background image is directional; and
  generating the activity image based on the target object and the background image.

12. The electronic device according to claim 11, wherein:
  the target object corresponds to a moving subject in the at least two images; and
  the original background images correspond to other part other than the target object in the at least two images.

13. The electronic device according to claim 11, wherein obtaining the direction information includes:
  analyzing the at least two images to obtain a moving direction of the target object directly as the direction information.

14. The electronic device according to claim 11, wherein obtaining the direction information includes:
  obtaining direction indication information, generated based on a user's input operation, as the direction information.

15. The electronic device according to claim 11, wherein:
  detecting the target object further includes detecting the target object further based on focusing information of the at least two images; and
  generating the activity image further includes distinguishing the original background images in the at least two images based on the target object.

16. The electronic device according to claim 11, wherein:
  detecting the target object further includes detecting the target object further based on focusing information and depth information of the at least two images; and
  generating the activity image further includes distinguishing the original background images in the at least two images based on the target object.

17. The electronic device according to claim 11, wherein the processor is further for:
  marking the target object in the at least two images in view of the changed area; and
  determining the original background images based on the target object.

18. The electronic device according to claim 11, wherein generating the background image includes:
  determining an area to be processed in the original background images based on the target object; and
  performing the image processing on the area to be processed in the original background images based on the direction information to generate the background image, such that the visual effect of the at least a portion of the background image is directional.

19. The method according to claim 2, wherein obtaining the direction information includes:
  obtaining direction indication information, based on a movement of an electronic device sensed by a sensor of the electronic device, as the direction information, wherein the at least two images are captured by the electronic device.

20. The method according to claim 1, wherein the texture effect includes a tailing effect.

* * * * *